(12) United States Patent
Chang (10) Patent No.: US 10,031,663 B2
(45) Date of Patent: Jul. 24, 2018

(54) INTERFACE OPERATING CONTROL DEVICE, METHOD, AND ELECTRONIC DEVICE USING THE SAME

(71) Applicant: NANNING FUGUI PRECISION INDUSTRIAL CO., LTD., Nanning (CN)

(72) Inventor: Wen-Hsin Chang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 135 days.

(21) Appl. No.: 15/141,847

(22) Filed: Apr. 29, 2016

(65) Prior Publication Data

US 2017/0269808 A1    Sep. 21, 2017

(30) Foreign Application Priority Data

Mar. 17, 2016   (TW) .............. 105108347 A (51) Int. Cl.
*G06F 3/041* (2006.01)
*G06F 3/0488* (2013.01)
*G06F 1/16* (2006.01)
*G06F 3/03* (2006.01)

(52) U.S. Cl.
CPC .......... *G06F 3/0488* (2013.01); *G06F 1/1626* (2013.01); *G06F 1/1686* (2013.01); *G06F 3/0304* (2013.01)

(58) Field of Classification Search
USPC ................ 345/173, 174, 156, 619, 175, 176
See application file for complete search history.

(56) References Cited

U.S. PATENT DOCUMENTS

| 8,577,644 B1* | 11/2013 | Ksondzyk ............. G06F 3/0414 345/173 |
| 9,043,183 B1* | 5/2015 | Ksondzyk ............. G06F 3/0414 345/173 |
| 2009/0271783 A1 | 10/2009 | Hsieh et al. |

(Continued)

FOREIGN PATENT DOCUMENTS

| TW | 201411469 A | 3/2014 |
| TW | I493426 B | 7/2015 |

*Primary Examiner* — Thuy Pardo
(74) *Attorney, Agent, or Firm* — ScienBiziP, P.C.

(57) ABSTRACT

An interface operating control device applied in an electronic device with an interface includes a sensing module, a recognizing module, a bottom layer executing module, and an operating module. The sensing module outputs sensing signal when a distance between the object and the interface is less than a preset distance. The recognizing module receives the sensing signal and acquires operating characteristics of the object according the sensing signal. The bottom layer executing module boots an application mode corresponding to the operating characteristics acquired currently. The operating module determines different intensity applied on the interface by the object according to total areas touching on the interface, and executes different operation instructions of the application mode currently operating according to the different intensity. Therefore, a system of the electronic device can be accessed rapidly and conveniently, and the users can get abundant operations and experiences.

20 Claims, 5 Drawing Sheets

(56) References Cited

U.S. PATENT DOCUMENTS

| | | | |
|---|---|---|---|
| 2011/0248941 A1* | 10/2011 | Abdo | G06F 3/0488 345/173 |
| 2011/0260994 A1* | 10/2011 | Saynac | G06F 3/0414 345/173 |
| 2012/0176403 A1* | 7/2012 | Cha | G06F 1/1694 345/619 |
| 2014/0019910 A1 | 1/2014 | Kim et al. | |
| 2014/0368455 A1* | 12/2014 | Croisonnier | G06F 3/0414 345/173 |
| 2015/0035781 A1* | 2/2015 | Oshinome | G06F 3/0488 345/173 |
| 2015/0091875 A1* | 4/2015 | Li | G06F 3/0421 345/176 |
| 2015/0301688 A1* | 10/2015 | Cho | G06F 3/0421 345/175 |
| 2015/0363066 A1* | 12/2015 | Lemay | G06F 3/0488 345/173 |
| 2016/0110051 A1* | 4/2016 | Yuan | G06F 3/0416 345/173 |
| 2016/0202832 A1* | 7/2016 | Chen | G06F 3/0488 345/173 |

* cited by examiner

INTERFACE OPERATING CONTROL DEVICE, METHOD, AND ELECTRONIC DEVICE USING THE SAME

FIELD

The subject matter herein generally relates to an interface operating control device, method, and electronic device using the same.

BACKGROUND

Application modes of electronic devices are usually boot by touching corresponding icons on screens of the electronic devices. Operations of the application modes are always tedious and inconvenient.

BRIEF DESCRIPTION OF THE DRAWINGS

Implementations of the present technology will now be described, by way of example only, with reference to the attached fingers.

DETAILED DESCRIPTION

It will be appreciated that for simplicity and clarity of illustration, where appropriate, reference numerals have been repeated among the different fingers to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure is described in relation to an interface operating control device, method, and electronic device using the same.

Figure 1:
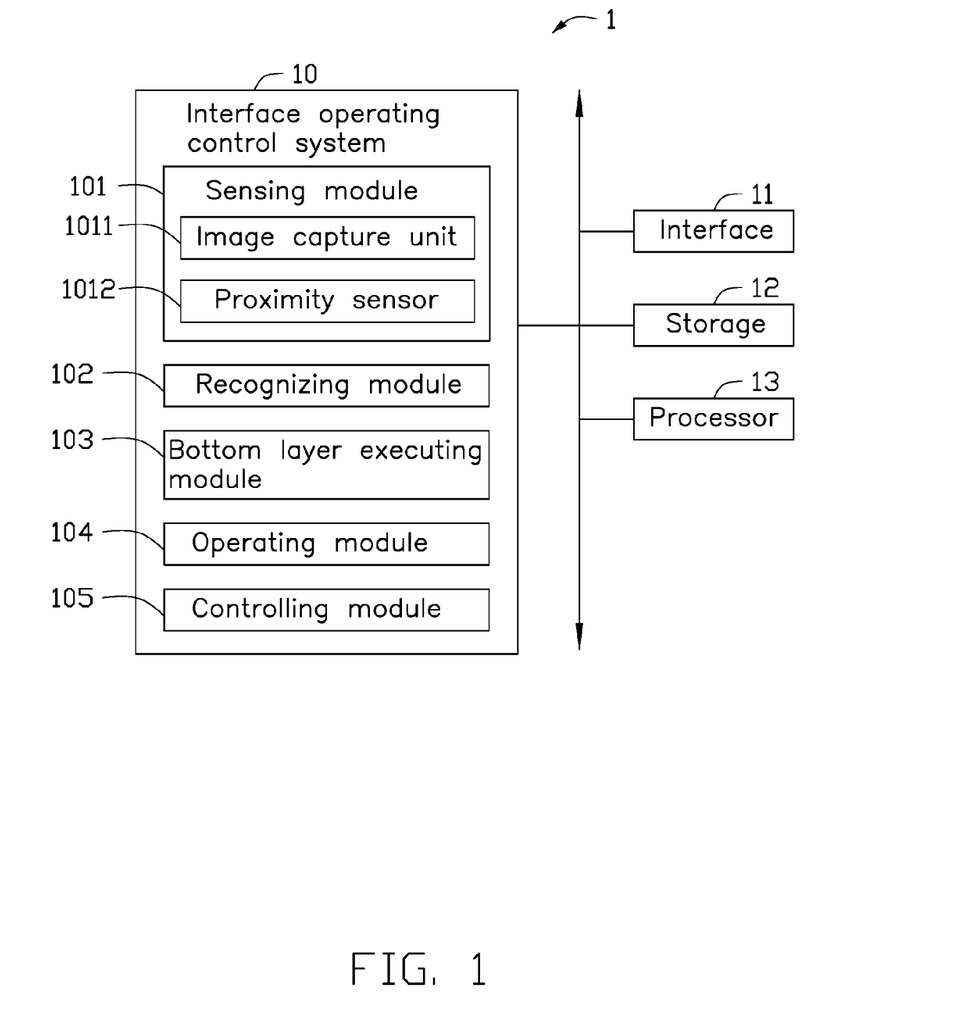
FIG. 1 is a block view of an exemplary embodiment of an interface operating control device applied in an electronic device, wherein the interface operating control device includes an operating module, and can sense an object in an sensing area to control an interface of the electronic device.

FIG. 1 illustrates a block view of an exemplary embodiment of an interface operating control device 10 applied in an electronic device 1. The electronic device 1 includes an interface 11, a storage 12, and a processor 13. The electronic device 1 can be, but not limited to, a mobile phone, a tablet computer, a personal digital assistant (PDA), and an electronic reader.

The interface operating control device 10 includes a sensing module 101, a recognizing module 102, and a bottom layer executing module 103, an operating module 104, and a controlling module 105. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be applied as either software and/or hardware modules and may be stored in any type of non-transitory computer-readable medium or other storage device, such as the storage 12 of the electronic device 1. Some non-limiting examples of non-transitory computer-readable medium include CDs, DVDs, BLU-RAY, flash memory, and hard disk drives. In at least one embodiment, the processor 13 can control each module to execute a corresponding function and cooperate with other module said before. The electronic device 1 can be a mobile phone, and the interface 11 can be the screen of the mobile phone.

The controlling module 105 can be configured to send a start command to the sensing module 101, when interface operating control device 10 starts to operate. The sensing module 101 can be one of or a combination of an image sensor, an infrared sensor, and an ultrasonic sensor. The sensing module 101 starts to work when receiving the start command. The sensing module 101 can be configured to sense whether an object is close to the interface 11 and output sensing signal when a distance between the object and the interface 11 is less than a preset distance. The image sensor, infrared sensor, and an ultrasonic sensor can be respectively configured to capture an image, receiving infrared ray, and emitting ultrasonic wave and receiving reflected ultrasonic wave of ambient scene, to determine whether an object is in vicinity of the sensing module 101 and a distance there between.

Figure 2:
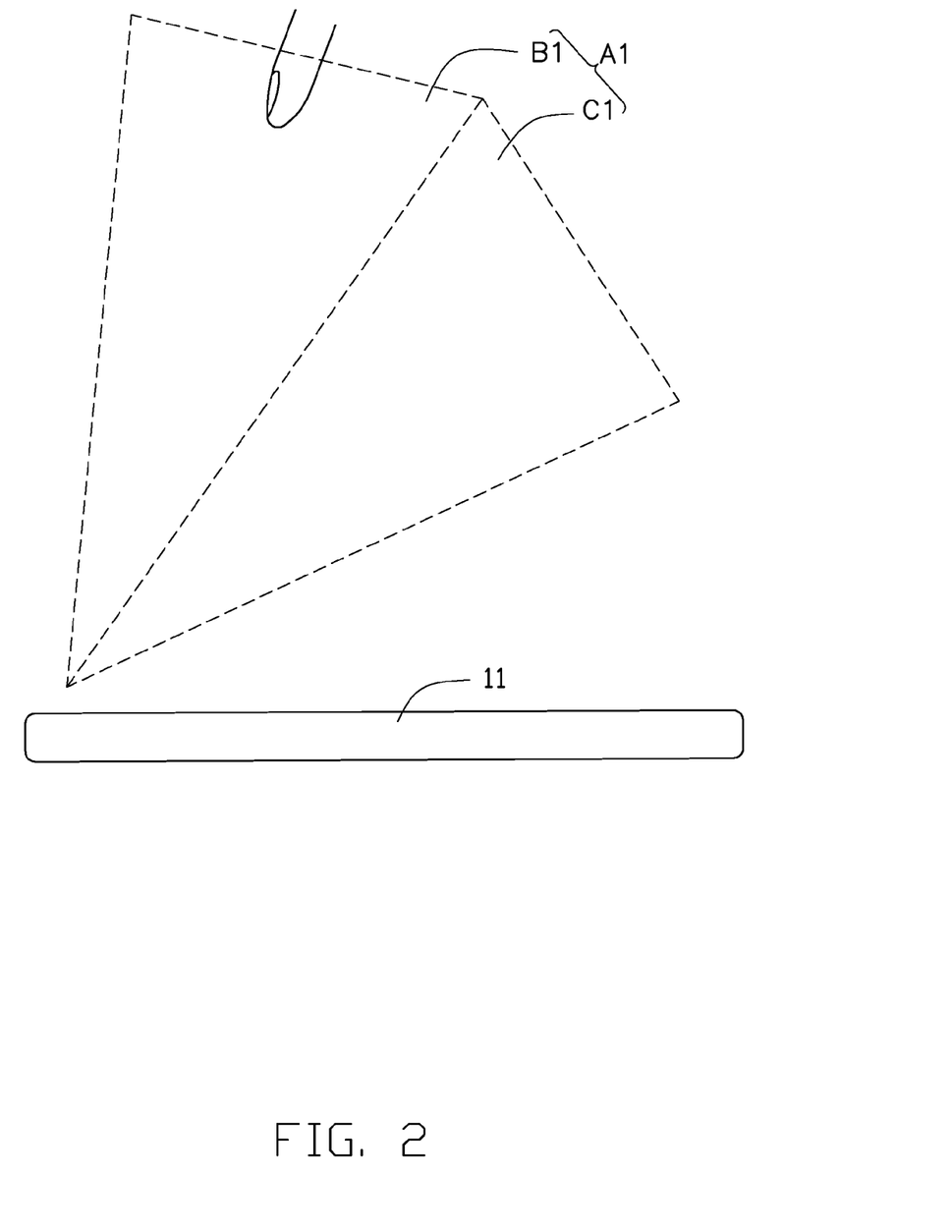
FIG. 2 is a schematic view of the sensing area at one side of the interface of the electronic device.

FIG. 2 illustrates a schematic view of a sensing area A1 of the interface 11 of the electronic device 1. The sensing module 101 includes an image capture unit 1011 and a proximity sensor 1012. The image capture unit 1011 is preferably be a front camera of the mobile phone. The proximity sensor 1012 is set beside the image capture unit 1011. In at least one embodiment, the object can be but not limited to hand of a user, other body part of a user, such as face of the user. The sensing module 101 detects whether an object is in the sensing area A1 and output sensing signal of the object. When at least one hand of the user closes to the interface 11, the image capture unit 1011 can be configured to shoot the object in the sensing area A1, and output an image information. The proximity sensor 1012 can be configured to detect a distance between the object and the interface 11, and output a distance information. The aforesaid sensing signal includes the image information and the distance informations.

The sensing area A1 is divided into a first detection area B1 and a second detection area C1, according to the distance between the object and the interface 11. When at least one hand of the user enters into the first detection area B1, the distance between the object and the interface 11 is greater than the preset distance, and the hand of the user can not order the interface 11. When at least one hand of the user enters into the second detection area C1, the distance between the object and the interface 11 is less than a preset distance, and the hand of the user can order the interface 11.

The controlling module 105 can control shooting frequency of the image capture unit 1011 according to the sensing signal output from the sensing module 101. When the controlling module 105 senses the hand of the user enters into the first detection area B1, the controlling module 105 controls the image capture unit 1011 to shoot the object in a low frequency. When the controlling module 105 senses the hand of the user enters into the second detection area C1, the controlling module 105 controls the image capture unit 1011 to shoot the object in a high frequency, to acquire shooting information frequently.

The controlling module 105 can be configured to control the recognizing module 102 to receive the shooting information output from the image capture unit 1011, and acquires operating characteristics of the object according to the shooting information. The operating characteristics can include a plurality of gestures and face features. In at least one embodiment, the plurality of gestures can be illustrated, and can include one of or combination of left hand, right hand, thumb of the left hand or right hand, index finger of the left hand or right hand, middle finger of the left hand or right hand, ring finger of the left hand or right hand, little finger of the left hand or right hand. Different operating characteristics of the object can correspond to different application modes. In at least one embodiment, different gestures can correspond to different application modes, such as a thumb of right hand corresponding to a camera mode, a thumb of left hand corresponding to a phone mode, a combination of the index finger of the right hand corresponding to a mail mode, middle finger of the left hand corresponding to a music mode and so on. These application modes can be stored in the storage 12. The gestures can be preset in various in the storage 12 according to actual demand, to correspond to different application modes.

The recognizing module 102 can compare the operating characteristics acquired from the image capture unit 1011 with the operating characteristics preset in the storage 12, to determine an application mode corresponding to operating characteristic acquired currently. The controlling module 105 controls the bottom layer executing module 103 to running data of the application mode and boot the application mode corresponding to operating characteristic acquired currently, and controls the application mode to appear on the interface 11.

Figure 3:
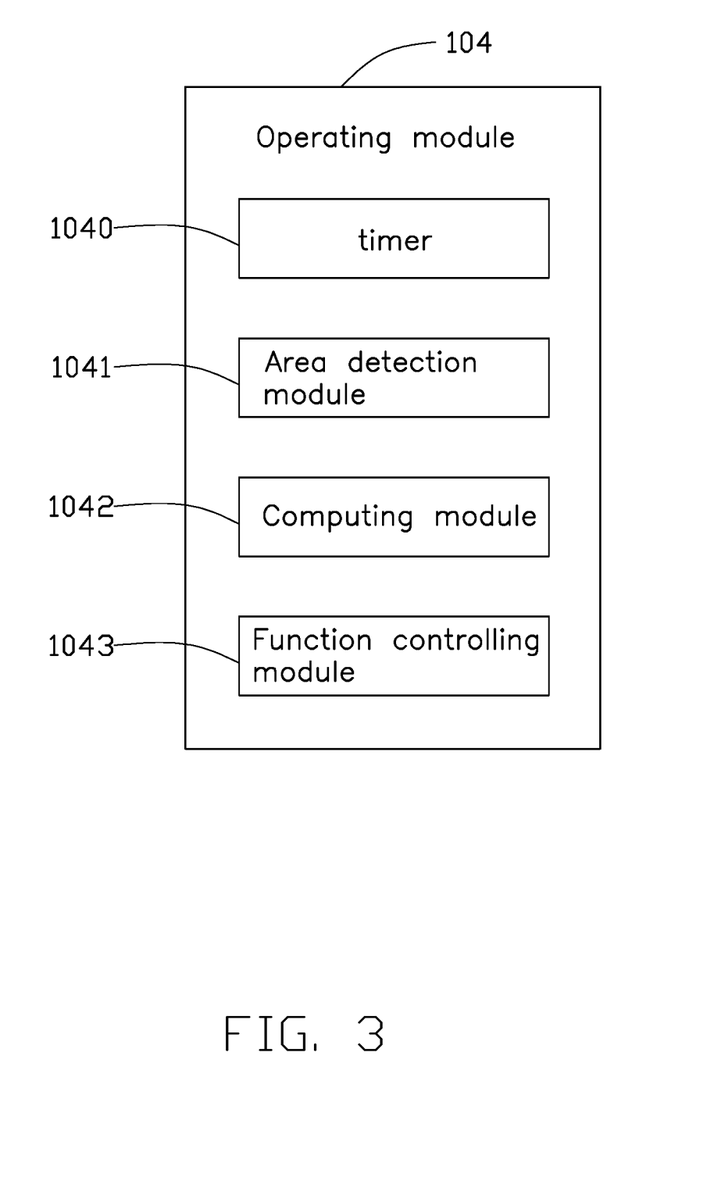
FIG. 3 is a block view of the operating module of the interface operating control device shown in FIG. 1.

FIG. 3 illustrates a block view of the operating module 104 of the interface operating control device 10. The operating module 104 includes a timer 1040, an area detection module 1041, a computing module 1042, and a function controlling module 1043.

Figure 4:
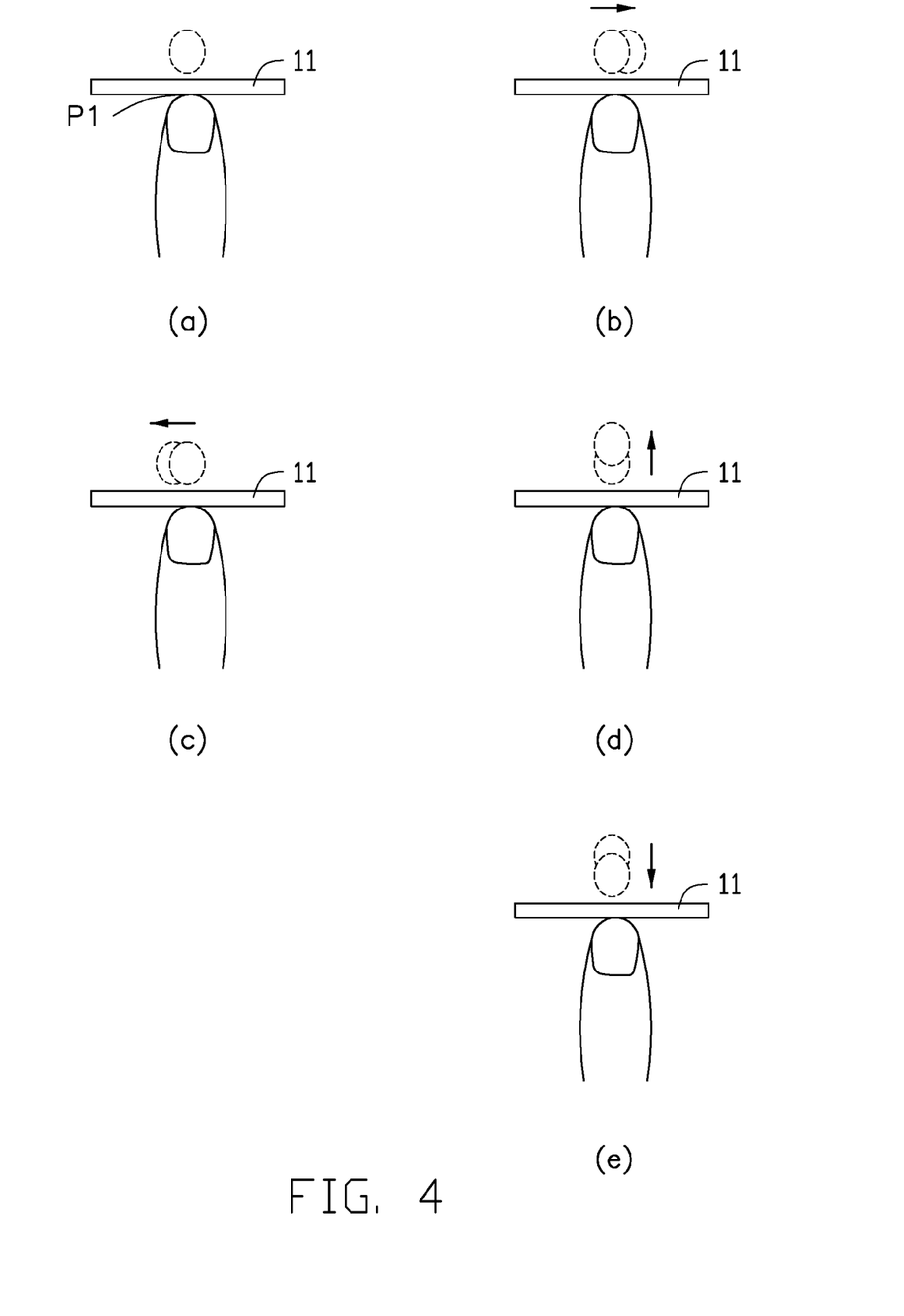
FIG. 4 is a schematic view of a plurality of actions applied with force and slant on the interface from initial position to plurality of directions, based on the interface operating control device shown in FIG. 1.

FIG. 4 illustrates a schematic view of a plurality of actions applied with an operation event applied on the interface 11 by a user finger. The operation event can be defined as a touch detected on the interface 11 till the touch is removed. The timer 1040 can be configured to detect a sustaining time of the operation event. The sustaining time can be configured to be a factor to determine an intensity of an operation event. The area detection module 1041 can be configured to detect a total area of a touch applied on the interface 11 by the finger of the user of the operation event. The total area includes an initial area of a touch applied on the interface 11 by the finger of the user and a change area touching the interface 11 with pressure and slant to a movement direction in the sustaining time. The total area can be a factor to determine an intensity, a slant direction and an inclination of an operation event. In general, a larger touch area can indicate an operation event with a greater intensity. The change area can indicate a slant direction of an operation event. The computing module 1042 can be configured to determine the intensity and the slant direction of the operation event of the finger of the user applied on the interface 11, according to the sustaining time timer and the total area. The function controlling module 1043 can be configured to execute different operation instructions of the application mode currently operating, according to intensity and the slant direction determined by the computing module 1042.

Figure 5:
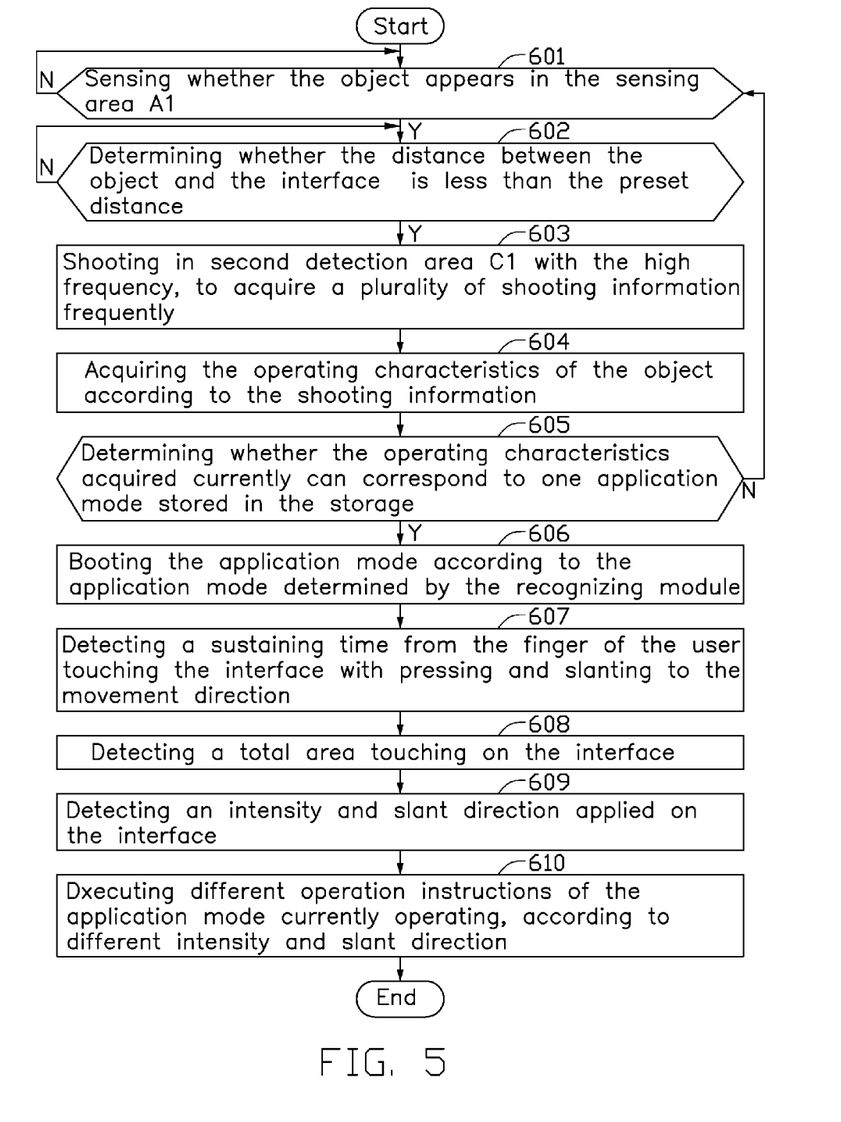
FIG. 5 is a flow view of an interface operating control method.

Referring to FIG. 5, a flowchart is presented in accordance with an example embodiment of the interface operating control device 10 which is being thus illustrated. The example method 600 is provided by way of example, as there are a variety of ways to carry out the method. The method 600 described below can be carried out using the configurations illustrated in FIG. 1, for example, and various elements of the finger is referenced in explaining example method 600. Furthermore, the illustrated order of blocks is by example only and the order of the blocks can change according to the present disclosure. Additional blocks may be added or fewer blocks may be utilized, without departing from this disclosure. The exemplary method 600 can be executed by the interface operating control device 10, and can begin at block 601.

At block 601, the controlling module 105 controls the image capture unit 1011 of the sensing module 101 to shoot in the sensing area A1 with the low frequency, to sense whether the object appears in the sensing area A1. If the object appears in the sensing area A1, the process goes to block S602, otherwise, the process goes back to block 601. In at least one embodiment, the object can be but not limited to hand of a user, other body part of a user, such as face of the user.

At block 602, the controlling module 105 determines whether the distance between the object and the interface 11 is less than the preset distance according to the distance information output from the sensing module 101, to make sure whether the object enters into the second detection area C1. If the distance between the object and the interface 11 is less than the preset distance, the process goes to block S603, otherwise, the process goes back to block 602.

At block 603, the controlling module 105 controls the image capture unit 1011 of the sensing module 101 to shoot in second detection area C1 with the high frequency, to acquire a plurality of shooting information frequently.

At block 604, the controlling module 105 controls the recognizing module 102 to receive the shooting information output from the image capture unit 1011, and acquires the operating characteristics of the object according to the shooting information. The operating characteristics can include a plurality of gestures and face features. In at least one embodiment, the plurality of gestures can be illustrated, and can include one of or combination of left hand, right hand, thumb of the left hand or right hand, index finger of the left hand or right hand, middle finger of the left hand or right hand, ring finger of the left hand or right hand, little finger of the left hand or right hand.

At block 605, the recognizing module 102 compares the operating characteristics acquired from the image capture unit 1011 with a plurality of operating characteristics preset in the storage 12, to determine whether the operating characteristics acquired currently can correspond to one application mode stored in the storage 12. If the operating characteristic acquired currently can correspond to one application mode stored in the storage 12, the process goes block 607, otherwise, the process goes back to block 601. In at least one embodiment, different gestures can correspond to different application modes, such as a thumb of right hand corresponding to a camera mode, a thumb of left hand corresponding to a phone mode, a combination of the index finger of the right hand corresponding to a mail mode, middle finger of the left hand corresponding to a music mode and so on. These application modes can be stored in the storage 12. The gestures can be preset in various in the storage 12 according to actual demand, to correspond to different application modes.

At block 606, the bottom layer executing module 103 reads data information and boot the application mode according to the application mode determined by the recognizing module 102, and controls the application mode to appear on the interface 11.

At block 607, the timer 1040 of the operating module 104 detects a sustaining time from the finger of the user touching the interface 11 with pressing and slanting to the movement direction, until the finger of the user leaves the interface 11.

At block 608, the area detection module 1041 detects a total area touching on the interface 11 by the finger of the user. The total area includes an initial area touching on the interface 11 by the finger of the user and a change area touching the interface 11 with pressing and slanting to a movement direction in the sustaining time.

At block 609, the computing module 1042 determines an intensity of the finger of the user applied on the interface 11 according to the sustaining time detected by the timer 1040, and determines the slant direction depends on the change area detected by the area detection module 1041. In at least one embodiment, a value of the intensity applied on the interface 11 depends on values of the time and area detected. The slant direction applied on the interface 11 is an extension direction of the change area detected. When the finger of the user moves towards to the left direction, the area detection module 1041 detects a left direction value output by the user to the interface 11.

At block 610, the function controlling module 1043 executes different operation instructions of the application mode currently operating, according to different intensity and slant directions determined by the computing module 1042. In at least one embodiment, when the application mode currently operating is the camera mode and the finger of the user presses the interface and slants to the left direction, the area detection module 1041 detects and transmits the total area and the change area to the computing module 1042. The computing module 1042 outputs a first instruction with a intensity and slant direction corresponding to the total area and the change area. The function controlling module 1043 controls pictures being browsed forward with a first speed. When the total area or the change area is enlarged, the intensity is also increased. The function controlling module 1043 controls pictures being browsed forward with a second speed greater than the first speed to get previous pictures rapidly, until the finger of the user leaves the interface 11.

When the finger of the user presses the interface and slants to the right direction, the computing module 1042 outputs a second instruct with a certain intensity and slant direction corresponding to the total area and the change area. The function controlling module 1043 controls pictures being browsed backward with a third speed. When the total area or the change area is enlarged, the intensity is also increased. The function controlling module 1043 controls pictures being browsed backward with a fourth speed greater than the third speed to get subsequent pictures rapidly, until the finger of the user leaves the interface 11.

When the finger of the user presses the interface and slants to the upper direction, the computing module 1042 outputs a third instruct with a certain intensity and slant direction corresponding to the total area and the change area. The function controlling module 1043 controls a picture appeared currently being amplified with a first magnification proportion. When the total area or the change area is enlarged, the intensity is also increased. The function controlling module 1043 controls the picture being amplified with a second magnification proportion greater than the first magnification proportion to amplify the picture rapidly, until the finger of the user leaves the interface 11.

When the finger of the user presses the interface and slants to the below direction, the computing module 1042 outputs a fourth instruct with a certain intensity and slant direction corresponding to the total area and the change area. The function controlling module 1043 controls the picture appeared currently being dwindled with a first minification proportion. When the total area or the change area is enlarged, the intensity is also increased. The function controlling module 1043 controls the picture being dwindled with a second minification proportion greater than the first minification proportion to dwindle the picture rapidly, until the finger of the user leaves the interface 11.

Thereby, the operating module 104 can control the pictures of the camera mode to be browsed forward or backward with different speeds depending on slanting the finger to left or right direction, and can control the pictures of the camera mode to be amplified or dwindled with different proportions depending on slanting to upper or below direction. The operating module 104 also can controls the web to be browsed forward or backward, or controls the volume to change in a video mode or music mode, depending on slanting the finger to left or right direction.

Therefore, a plurality of application modes of the electronic device 1 can be boot when at least one hand of the user closes to, but not touches to the interface 11 of the electronic device 1, which can access a system of the electronic device 1 rapidly and conveniently. The application modes can also be controlled to execute different operations depending on different slant direction and intensity applied on the interface 11 by the user. Thus, the users can get abundant operations and experiences.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An interface operating control device configured to be applied in an electronic device with an interface, the interface operating control device comprising:
   a sensing module configured to sense whether an object closes to the interface, and output sensing signal when a distance between the object and the interface is less than a preset distance;
   a recognizing module configured to receive the sensing signal output from the sensing module, and configured to acquire operating characteristics of the object from the sensing signal;
   a bottom layer executing module configured to boot an application mode corresponding to the operating characteristics acquired currently by the recognizing module; and
   an operating module configured to:

detect total areas of a touch applied on the interface by the object;
determine intensity of the touch applied on the interface; and
execute operation instructions of the application mode currently operating, corresponding to the intensity;
detect different change areas being touched on the interface with different certain pressure and slant by the object;
determine different slant directions according to the detected change areas; and
execute different operation instructions of the application mode currently operating, according to the different slant directions detected.

2. The interface operating control device according to claim 1, wherein the operating module can be further configured to:
detect a sustaining time from the object touching the interface with a certain pressure and slant in one direction;
determine intensity of the touch applied on the interface according to the sustaining time; and
execute operation instructions of the application mode currently operating, corresponding to the intensity.

3. The interface operating control device according to claim 2, wherein the operating module be further configured to control pictures appeared on the interface to be browsed forward or backward with different speeds depending on slanting the object to left or right direction.

4. The interface operating control device according to claim 2, wherein the operating module be further configured to control the pictures appeared on the interface to be amplified or dwindled with different proportions depending on slanting to upper or below direction.

5. The interface operating control device according to claim 1, wherein the sensing module is configured to sense image, infrared ray, or ultrasonic wave of the object, to make sure whether the object closes to the interface.

6. The interface operating control device according to claim 1, wherein the sensing module includes an image capture unit and a proximity sensor, the image capture unit can be a camera, wherein the operating control device further comprises:
a controlling module configured to control the sensing module to shoot the object with the camera in a high frequency, to acquire a plurality of shooting information frequently, when the distance between the object and the interface is less than the preset distance.

7. An interface operating control method, comprising:
sensing whether an object closes to the interface, and outputting sensing signal when a distance between the object and the interface is less than a preset distance;
receiving the sensing signal output from the sensing module, and configured to acquire operating characteristics of the object from the sensing signal;
booting an application mode corresponding to the operating characteristics acquired currently by the recognizing module;
detecting total areas of a touch applied on the interface by the object;
determining intensity of the touch applied on the interface; and
executing operation instructions of the application mode currently operating, corresponding to the intensity;
detect different change areas being touched on the interface with different certain pressure and slant by the object;
determining different slant directions according to the detected change areas; and
executing different operation instructions of the application mode currently operating, according to the different slant directions detected.

8. The method according to claim 7, further comprising:
detecting a sustaining time from the object touching the interface with a certain pressure and slant in one direction;
determining intensity of the touch applied on the interface according to the sustaining time; and
executing operation instructions of the application mode currently operating, corresponding to the intensity.

9. The method according to claim 8, wherein pictures appeared on the interface can be browsed forward or backward with different speeds depending on slanting the object to left or right direction.

10. The method according to claim 8, wherein pictures appeared on the interface can be amplified or dwindled with different proportions depending on slanting to upper or below direction.

11. The method according to claim 7, wherein sensing image, infrared ray, or ultrasonic wave of the object, to make sure whether the object closes to the interface.

12. The interface operating control method to according claim 7, further comprising:
controlling the sensing module to shoot the object with a camera in a high frequency, to acquire a plurality of shooting information frequently, when the distance between the object and the interface is less than the preset distance.

13. An electronic device comprising an interface operating control device and an interface, the interface operating control device comprising:
a sensing module configured to sense whether an object closes to the interface, and output sensing signal when a distance between the object and the interface is less than a preset distance;
a recognizing module configured to receive the sensing signal output from the sensing module, and configured to acquire operating characteristics of the object from the sensing signal;
a bottom layer executing module configured to boot an application mode corresponding to the operating characteristics acquired currently by the recognizing module; and
an operating module configured to:
detect total areas of a touch applied on the interface by the object;
determine intensity of the touch applied on the interface; and
execute operation instructions of the application mode currently operating, corresponding to the intensity;
detect different change areas being touched on the interface with different certain pressure and slant by the object;
determine different slant directions according to the detected change areas; and
execute different operation instructions of the application mode currently operating, according to the different slant directions detected.

14. The electronic device according to claim 13, wherein the operating module can be further configured to:
detect a sustaining time from the object touching the interface with a certain pressure and slant in one direction;

determine intensity of the touch applied on the interface according to the sustaining time; and execute operation instructions of the application mode currently operating, corresponding to the intensity.

15. The electronic device according to claim 14, wherein the operating module be further configured to control pictures appeared on the interface to be browsed forward or backward with different speeds depending on slanting the object to left or right direction.

16. The electronic device according to claim 14, wherein the operating module be further configured to control the pictures appeared on the interface to be amplified or dwindled with different proportions depending on slanting to upper or below direction.

17. The electronic device according to claim 13, wherein the sensing module is configured to sense image, infrared ray, or ultrasonic wave of the object, to make sure whether the object closes to the interface.

18. The electronic device according to claim 13, wherein the sensing module includes an image capture unit and a proximity sensor, the image capture unit can be a front camera of the electronic device.

19. The electronic device according to claim 13, wherein when the distance between the object and the interface is less than the preset distance, the controlling module controls the sensing module of to shoot with a high frequency, to acquire a plurality of shooting information frequently.

20. The electronic device according to claim 13, further comprising a storage, wherein the recognizing module compares the operating characteristics acquired from the sensing module with a plurality of operating characteristics preset in the storage, to determine whether the operating characteristics acquired currently can correspond to one application mode stored in the storage.

* * * * *